(12) United States Patent
Matsuhashi et al.

(10) Patent No.: US 11,091,824 B2
(45) Date of Patent: Aug. 17, 2021

(54) FERRITIC STAINLESS STEEL AND METHOD FOR PRODUCING SAME, AND HEAT EXCHANGER EQUIPPED WITH FERRITIC STAINLESS STEEL AS MEMBER

(71) Applicant: Nippon Steel & Sumikin Stainless Steel Corporation, Tokyo (JP)

(72) Inventors: Tooru Matsuhashi, Hikari (JP); Yuuichi Tamura, Kashima (JP)

(73) Assignee: NIPPON STEEL & SUMIKIN STAINLESS STEEL CORPORATION, Tokyo (JP)

( * ) Notice: Subject to any disclaimer, the term of this patent is extended or adjusted under 35 U.S.C. 154(b) by 710 days.

(21) Appl. No.: 15/327,537

(22) PCT Filed: Jul. 16, 2015

(86) PCT No.: PCT/JP2015/070402
§ 371 (c)(1),
(2) Date: Jan. 19, 2017

(87) PCT Pub. No.: WO2016/013482
PCT Pub. Date: Jan. 28, 2016

(65) Prior Publication Data
US 2017/0175237 A1    Jun. 22, 2017

(30) Foreign Application Priority Data

Jul. 22, 2014   (JP) .............................. JP2014-149100

(51) Int. Cl.
| | | |
|---|---|---|
| *C22C 38/06* | (2006.01) | |
| *C22C 38/60* | (2006.01) | |
| *C21D 9/46* | (2006.01) | |
| *B23K 1/19* | (2006.01) | |
| *C22C 38/44* | (2006.01) | |
| *B23K 1/008* | (2006.01) | |
| *B23K 1/00* | (2006.01) | |
| *C21D 1/773* | (2006.01) | |
| *C21D 6/00* | (2006.01) | |
| *C22C 38/00* | (2006.01) | |
| *C22C 38/02* | (2006.01) | |
| *C22C 38/04* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |
| *C22C 38/32* | (2006.01) | |
| *C22C 38/42* | (2006.01) | |
| *C22C 38/48* | (2006.01) | |
| *C22C 38/50* | (2006.01) | |

(Continued)

(52) U.S. Cl.
CPC .............. *C22C 38/60* (2013.01); *B23K 1/008* (2013.01); *B23K 1/0012* (2013.01); *B23K 1/19* (2013.01); *C21D 1/773* (2013.01); *C21D 6/002* (2013.01); *C21D 9/46* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *C22C 38/44* (2013.01); *C22C 38/48* (2013.01); *C22C 38/50* (2013.01); *F28F 21/083* (2013.01); *B23K 2101/14* (2018.08); *B23K 2103/04* (2018.08); *C21D 2211/005* (2013.01)

(58) Field of Classification Search
CPC ....................................................... C22C 38/06
See application file for complete search history.

(56) References Cited

U.S. PATENT DOCUMENTS

| | | | |
|---|---|---|---|
| 2010/0122800 A1 | 5/2010 | Nishida et al. | |
| 2010/0272594 A1 | 10/2010 | Hiraide | |

(Continued)

FOREIGN PATENT DOCUMENTS

| | | | |
|---|---|---|---|
| JP | 2-185962 A | 7/1990 | |
| JP | 7-180001 A | 7/1995 | |

(Continued)

OTHER PUBLICATIONS

Chinese Office Action and Search Report for corresponding Chinese Application No. 201580038566.6, dated Oct. 30, 2017, with an English translation of the Search Report.

(Continued)

*Primary Examiner* — Jophy S. Koshy
(74) *Attorney, Agent, or Firm* — Birch, Stewart, Kolasch & Birch, LLP

(57) ABSTRACT

A ferritic stainless steel and a heat exchanger using the ferritic stainless steel are provided. The ferritic stainless steel includes, in mass %, C: 0.030% or less, N: 0.020% or less, Si: 0.5% or less, Mn: 1.0% or less, P: 0.05% or less, S: 0.01% or less, Cr: 16% to 25%, Nb: 0.05% to 1.0%, Al: 0.003% to 0.20%, and a balance comprising Fe and unavoidable impurities. The Al oxide is present on the surface of the material, the surface coverage ratio by the Al oxide is 5% to 70%, the surface roughness in Ra measured by red laser is 0.010-0.15 μm, and the thickness from the surface to the point, which includes the value of a half peak of the Al content on the surface, satisfies 300 nm or less, the value of a half peak of the Al content in an elemental profile expressed by a cation ratio.

12 Claims, No Drawings

(51) Int. Cl.
*F28F 21/08* (2006.01)
*B23K 101/14* (2006.01)
*B23K 103/04* (2006.01)

(56) References Cited

U.S. PATENT DOCUMENTS

| | | | |
|---|---|---|---|
| 2014/0069619 A1 | 3/2014 | Hiraide et al. | |
| 2015/0376732 A1* | 12/2015 | Hamada | C22C 38/26 148/610 |
| 2015/0376733 A1* | 12/2015 | Kanno | C21D 8/0236 148/610 |
| 2016/0002760 A1* | 1/2016 | Hiraide | C22C 38/002 403/272 |
| 2016/0017451 A1* | 1/2016 | Kimura | C22C 38/24 148/608 |

FOREIGN PATENT DOCUMENTS

| | | |
|---|---|---|
| JP | 7-292446 A | 11/1995 |
| JP | 2001-279389 A | 10/2001 |
| JP | 2002-106970 A | 4/2002 |
| JP | 2003-328088 A | 11/2003 |
| JP | 3608383 B2 | 1/2005 |
| JP | 2006-175506 A | 7/2006 |
| JP | 2008-238189 A | 10/2008 |
| JP | 2009-174046 A | 8/2009 |
| JP | 2010-121208 A | 6/2010 |
| JP | 2010-285683 A | 12/2010 |
| JP | 2011-157616 A | 8/2011 |
| JP | 2012-117691 A | 6/2012 |
| JP | 2012-214880 A | 11/2012 |
| JP | 2012-214881 A | 11/2012 |
| JP | 2013-10981 A | 1/2013 |
| JP | 2013-152068 A | 8/2013 |
| JP | 2013-204149 A | 10/2013 |
| KR | 10-2010-0058853 A | 6/2010 |
| WO | WO 2005/014873 A1 | 2/2005 |
| WO | WO-2014119796 A1 * | 8/2014 ............ C22C 38/46 |
| WO | WO-2014136866 A1 * | 9/2014 ........... C22C 38/004 |
| WO | WO-2014142302 A1 * | 9/2014 ............ C22C 38/02 |
| WO | WO-2014157066 A1 * | 10/2014 ............ C22C 38/02 |
| WO | WO-2014157104 A1 * | 10/2014 ........... C22C 38/008 |
| WO | WO-2014157341 A1 * | 10/2014 ............ C22C 38/26 |
| WO | WO-2014157578 A1 * | 10/2014 ............... C21D 9/46 |
| WO | WO-2015108072 A1 * | 7/2015 ............... C23C 8/14 |
| WO | WO-2015141674 A1 * | 9/2015 ............ C22C 38/38 |
| WO | WO-2015145825 A1 * | 10/2015 ........... C22C 38/001 |
| WO | WO-2015147211 A1 * | 10/2015 ............ C22C 38/26 |

OTHER PUBLICATIONS

Japanese Notice of Reasons for Rejection for corresponding Japanese Application No. 2014-149100, dated Aug. 22, 2017, with an English translation.
Extended European Search Report dated Nov. 15, 2017, for corresponding European Application No. 15824703.1.
International Search Report (PCT/ISA/210) issued in PCT/JP2015/070402, dated Aug. 25, 2015.
Written Opinion (PCT/ISA/237) issued in PCT/JP2015/070402, dated Aug. 25, 2015.

* cited by examiner

FERRITIC STAINLESS STEEL AND METHOD FOR PRODUCING SAME, AND HEAT EXCHANGER EQUIPPED WITH FERRITIC STAINLESS STEEL AS MEMBER

TECHNICAL FIELD

The present invention relates to: a ferritic stainless steel, which has excellent heat exchange properties, corrosion resistance, and brazing property; and a heat exchanger using the ferritic stainless steel as a component.

Priority is claimed on Japanese Patent Application No. 2014-149100, filed Jul. 22, 2014, the content of which is incorporated herein by reference.

BACKGROUND ART

In general, the heat exchanger is a device for transferring heat generated in combustion of various fuels to the medium, which is mainly water, and used as a component of systems in various fields covering from the the nuclear power plant to the hot water supply device in the general house hold. Application to reuse the heat from the exhaust gas, which is generated in many kinds of combustions, is increased particularly from increased awareness of recent environmental problems. Thus, demands for such heat exchangers are increasing. As material properties required for such devices, when combustion exhaust gas is used, the aqueous corrosion by the condensed water in the case of a relatively low temperature at about 200° C. or less; and the steam oxidation and the high temperature oxidation in the case of the even higher temperature exhaust gas, are named. Having insufficient these properties causes problems. The stainless steel excel in the above-described properties is broadly used for these heat exchanger. When it is a heat exchanger for recovering the latent heat of steam included in the exhaust gas, the above-described condense water is generated in the heat exchanger since the exhaust gas temperature after recovering heat becomes lower than 100° C. Generally, due to NOx and/or SOx in the exhaust gas, which are formed in combustion, being dissolved in the condensed water, pH of the condense water becomes 3 or less in many cases. In the pH of such an environment, it is possible for cupper (corroded at pH 6.5 or less), the common steel (corroded at about pH 7 or less), and aluminum (corroded at about pH 3 or less) to be corroded. Thus, the titanium steel and the stainless steel are chosen, as materials having corrosion resistance in this pH range.

As a stainless steel for the heat exchangers, in view of the corrosion resistance, SUS316L (18Cr-10Ni-2Mo) has been used mainly. SUS316L satisfies the required corrosion resistance of the heat exchanger. However, plenty of Ni, the price stability of which is extremely unstable, is included in the raw material. Particularly, Ni is a rare metal and an element desired for its usage to be reduced. In addition, there is a case where a speculative turbulence in the price occurs. Thus, reduction of Ni usage is desired in terms of price stability. As the structural material of the heat exchanger expected to be used broadly with the increasing environmental awareness in the future, a further cost reduction is demanded strongly; and proposals of lower cost alternative materials are expected by necessity. In addition, in the view of the corrosion resistance, the austenitic stainless steel has the possibility of the stress corrosion cracking occurred, which is one weak point of the austenitic stainless steel, due to corrosion, when it is used in an environment with high flying chloride concentration in the vicinity of the coast. In addition, under a condensed water environment with high chloride concentration, it has been pointed out that the corrosion resistance of the austenitic stainless steel is inferior to the corrosion resistance of the ferritic stainless steel containing equivalent levels of Cr and Mo occasionally. Thus, as the heat exchanger material used in the environment where the condense water is formed, application of the ferritic stainless steel has been proceeded.

In the heat exchanger, the two media flow without merging separated by a dividing wall in a pipe or plate shape, generally. Heat is exchanged therebetween: by flowing a high temperature medium in one fluid path; and by flowing a low temperature liquid or gas in another fluid path. When heat from the exhaust gas is recovered as the high temperature medium, there is a case in which various corrosive gases, such as NOx, SOx, and the like, is included in the media as described above. When the latent heat of the steam included in the media is recovered, a corrosive constituent, such as nitric acid, sulfuric acid and the like, is included in the condensed liquid. Thus, as the properties required for heat exchangers, high corrosion resistance in the above-described medium and high heat exchange properties on the surface of the material are important. As the heat exchange properties, having a surface where the condense water is prone to be agglomerated on the material surface is desirable. For example, improving hydrophilicity on the material surface and increasing the surface area for increasing the efficiency can be named.

The ferritic stainless steel has properties of: high heat conductivity; low heat expansion coefficient; and the like, in addition to the resistance to the stress corrosion cracking compared to the austenitic stainless steel. Having high heat conductivity means high heat exchange efficiency as a heat exchanger. Having low heat expansion coefficient means less stress fluctuation due to temperature change in the whole heat exchanger. Thus, the ferritic stainless steel has numerous advantages, such as higher design accuracy and the like, over the austenitic stainless steel as the material for heat exchangers. Because of the above-described properties, attempts to apply the ferritic stainless steel to the heat exchanger component have been made.

In Patent Literature (PTL 1), it is disclosed that a heat exchanger for recovering latent heat, which has excellent heat conductivity, corrosion resistance and brazing property; and includes the relatively inexpensive pipe and fins, can be obtained by applying SUS436J1L, SUS436L, SUS444, which are ferritic stainless steels, to the heat exchanger for recovering the latent heat.

In addition, in Patent Literature 2 (PTL 2), defining the contents of Cr, Mo, Si and Al by relationship between the plate thickness and the operating environmental temperature as a ferritic stainless steel exhibiting durability in the high temperature steam environment among the heat exchanger environment.

In Patent Literature 3(PTL 3), an equipment for latent heat recovery type hot water production having improved corrosion resistance is disclosed by using a ferritic stainless steel, on which an oxide layer including 25% or more of Ti (in the cation atomic ratio) is formed on the surface layer.

On the other hand, as a method for improving hydrophilicity of the stainless steel, setting the average concentration of Si+Mn to 5.0 mass % or more on the surface layer part of the ferritic steel material is disclosed in Patent Literature 4 (PTL 4).

In addition, in Patent Literature 5 (PTL 5), an equipment for latent heat recovery type hot water production is disclosed. In the equipment for latent heat recovery type hot water production disclosed in PTL 5, a chromium oxide film, which includes the Cr concentration of 80% or more in the cation ratio on the surface layer is formed by controlling the material composition of the ferritic stainless steel and the atmosphere during brazing

CITATION LIST

Patent Literature

PTL 1: Japanese Unexamined Patent Application, First Publication No. 2002-106970 (A)
PTL 2: Japanese Unexamined Patent Application, First Publication No. 2003-328088 (A)
PTL 3: Japanese Unexamined Patent Application, First Publication No. 2012-117691 (A)
PTL 4: Japanese Unexamined Patent Application, First Publication No. 2001-279389 (A)
PTL 5: Japanese Unexamined Patent Application, First Publication No. 2013-152068 (A)

SUMMARY OF INVENTION

Technical Problem

In PTL 1, the steel grade component is only defined in the broad ranges within the JIS standard; and PTL 1 is silent about a way to improve the latent heat recovery efficiency of the condense water. In addition, the chemical composition only includes the elements described in the JIS standard; PTL 1 is silent about usage of the elements, such as Ti, Al, and the like, effective for the properties obtained in the present invention, which are described later.

In PTL 2, it is clearly described that the properties suppressing oxidation of the steam is needed as the properties of the material itself; and the expected temperature in the usage environment is very high as 700° C. to 1150° C. in Example. In order to obtain the property, PTL 2 is characterized in having the two layer structure, in which the Cr-based protective oxide is formed on the outer layer side on the surface of the material; and the highly protective Si—Al-based protective oxide is formed as the inner layer of the Cr-based protective oxide. On the other hand, the properties needed for the heat exchanger mainly envisioned for the present invention is corrosion resistance and heat exchange properties against the medium at 200° C. or less. Thus, there is no requirement for the coating film needed in the present invention to be the two-layered oxide structure; and the coating film in the present invention is oxides mainly of Ti and/or Al. Thus, demanded characteristics in the present invention are different from ones in PTL 2.

In PTL 3, it is disclosed that enriching the Ti oxide on the surface of the ferritic stainless steel used for the equipment for latent heat recovery type hot water production, is effective for improving corrosion resistance. However, PTL 3 is silent about oxide coating film of other element. In addition, the Ti concentration on the surface layer is 25% or higher (in the cation atomic ratio) and high. In production of the latent heat recovery type heat exchanger, brazing is performed generally. However, the excessive Ti enrichment on the surface as in PTL 3 deteriorates brazing property. Thus, there is a possibility of encountering a problem in the brazing treatment in actual manufacturing even with the excellent corrosion resistance.

In PTL 4, it is disclosed that having the Si and Mn oxide coating film is effective for imparting hydrophilicity to the ferritic stainless steel. However, PTL 4 is silent about usage of Ti and/or Al. In addition, PTL 4 is characterized in forming the Si and Mn oxide coating film by bright annealing. This condition is a lower temperature shorter time treatment than the brazing heat treatment in the present invention, which is described later. Thus, the composition of and thickness of the coating film in PTL 4 are fundamentally different from ones in the present invention.

In PTL 5, as a way to increase the Cr concentration on the surface of the ferritic stainless steel, the condition, in which heating is performed at the temperature of 1000° C. to 1200° C. for the time range not exceeding 120 minutes; and the atmosphere of the heating temperature of 900° C. or higher is set to the vacuum atmosphere of $10^{-1}$ Pa to $10^{-2}$ Pa or the hydrogen atmosphere having the dew point of −80° C. to −90° C., is disclosed. However, in the former vacuum condition, the problem not being able to perform brazing occurs since it is the condition where Cr is oxidized and the base material and the brazing material cannot react to each other because of the presence of the Cr coating film. In the latter extremely low dew point condition, brazing would be performed. However, it is possible that the manufacturing cost is increased since it is needed for the dew point to be set to an even lower temperature than the standard brazing atmosphere in order to enrich Cr on the surface coating film.

As explained above, the ferritic stainless steel suitable for heat exchanger components has not been sufficiently disclosed. The present invention is made under the circumstance described above. The purpose of the present invention is to provide a ferritic stainless steel and a heat exchanger, which are capable of being manufactured in the general brazing condition for stainless steel, and can be suitably used as an inexpensive heat exchanger component having excellent corrosion resistance.

Solution to Problem

In order to solve the technical problems described above, the inventors of the present invention conducted intensive studies about the ferritic stainless steel having the properties needed for the heat exchanger, which are excellent (1) heat exchange properties; (2) corrosion resistance; and (3) brazing property. As a result, the inventors of the present invention found that: (1) in terms of the heat exchange properties, the heat exchange properties to gas or liquid of the medium are improved by stimulating condensation of steam from the exhaust gas on the surface, and it is necessary that the Al oxide coating film or the Ti and Al oxide coating film exists on the outermost layer in a fine particle; (2) the corrosion resistance in the environment is improved by the Al oxide coating film or the Ti and Al oxide coating film; and (3) in terms of securing the brazing property, it is necessary to control the formation of the Al oxide coating film or the Ti and Al oxide coating film appropriately.

The present invention relates to the ferritic stainless steel configured as described below and having excellent heat exchange properties, corrosion resistance, and brazing property.

(1) A ferritic stainless steel including, in a mass %, C: 0.030% or less, N: 0.030% or less, Si: 1.0% or less, Mn: 1.0% or less, P: 0.05% or less, S: 0.01% or less, Cr: 13% to 25%, Al: 0.003% to 0.30%, and a balance made of Fe and unavoidable impurities, wherein, an Al oxide is present on a surface of a material,
a surface coverage ratio by the Al oxide is 5% to 70%,
a surface roughness in Ra measured by red laser is 0.010 µm to 0.15 µm, and a thickness from the surface to a point, which includes a value of a half peak of an Al content on the surface, satisfies 5 to 300 nm, the value of a half peak of the Al content being obtained from an elemental profile expressed by a cation ratio.

(2) A ferritic stainless steel including, in a mass %, C: 0.030% or less, N: 0.030% or less, Si: 1.0% or less, Mn: 1.0% or less, P: 0.05% or less, S: 0.01% or less, Cr: 13% to 25%, Ti: 0.001% to 0.30%, Al: 0.003% to 0.30%, and a balance made of Fe and unavoidable impurities, wherein, one of or both of an Al oxide and a Ti oxide are present on a surface of a material, a surface coverage ratio by the Al oxide is 5% to 70%, a surface roughness in Ra measured by red laser is 0.010 μm to 0.15 μm, and a thickness from the surface to a point, which includes a value of a half peak (height) of an Al content or an Ti content on the surface, satisfies 5 to 300 nm, the value of a half peak of the Al content or the Ti content being obtained from an elemental profile expressed by a cation ratio, and the Al content or the Ti content on the surface being one of higher one.

(3) The ferritic stainless steel according to the above-described (1) or (2), further including, one of or both of Mo: 3% or less and Nb: 0.05% to 1.0%, in mass %.

(4) The ferritic stainless steel according to any one of the above-described (1) to (3), further including one or more of Ni: 2.0% or less, Cu: 1.0% or less, and Sn, Sb, Zr, Co, W: 0.5% or less, in mass %.

(5) The ferritic stainless steel according to any one of the above-described (1) to (4), further including one or more of V: 1.0% or less, B: 0.0030% or less, Mg: 0.0050% or less, La: 0.1% or less, Y: 0.1% or less, Hf: 0.1% or less, and REM: 0.1% or less, in mass %.

(6) The ferritic stainless steel according to any one of the above-described (1) to (5), further including 0.05% or less of Ga in mass %.

(7) The ferritic stainless steel according to any one of the above-described (1) to (6), further including 0.0050% or less of Ca in mass %.

(8) A method of producing the ferritic stainless steel according to any one of the above-described (1) to (7), as a way to form the oxide, the method including the steps of:

setting a degree of vacuum less than $1\times10^{-2}$ Pa until temperature reaches 400° C. during heating; performing a heat treatment at a soaking temperature of 900° C. to 1200° C. for a soaking time of 120 minutes or less; and adjusting the degree of vacuum to $10^{-2}$ Pa to $10^1$ Pa after the temperature reaches to the soaking temperature.

(9) The ferritic stainless steel according to any one of the above-described (1) to (7), wherein the ferritic stainless steel is for a heat exchanger.

(10) A heat exchanger including the ferritic stainless steel according to any one of the above-explained (1) to (7) as a component.

Advantageous Effects of Invention

According to the present invention, in place of the austenitic stainless steel supplemented with plenty of expensive Ni and Mo, a ferritic stainless steel for a heat exchanger having excellent heat exchange properties, corrosion resistance, and brazing property can be provided. Particularly, the ferritic stainless steel can exhibit excellent properties as the heat exchanger material and the heat exchanger utilizing the latent heat of the condense water, such as the secondary heat exchanger of gas hot water supply device and the heat recovery unit of an automobile.

DESCRIPTION OF EMBODIMENTS

The inventors of the present inventors conducted intensive studies to provide a ferritic stainless steel having excellent properties as a heat exchanger. As a result, they obtained findings below.

(1) In terms of the heat exchange properties, forming extremely fine roughness on the outermost layer is effective, particularly in the type of the heat exchanger utilizing the latent heat of the condense water. These fine roughness can be obtained by precipitating aluminum oxide or titanium and aluminum oxide appropriately.

(2) The corrosion resistance is improved by the Al oxide coating film or the Ti and Al coating film precipitated on the surface layer in the above-described (1).

(3) In terms of the brazing property essential for manufacturing the heat exchanger structure, it is inhibited by excessive formation of the Al oxide coating film or the Ti and Al oxide coating film. Thus, not only the thickness and the composition of the oxide, but the timing of the formation of the oxide is needed to be controlled appropriately.

First, the heat exchange properties of the (1) above is explained. In the heat exchanger, particularly in the type of the heat exchanger utilizing the latent heat of the condense water, the latent heat during liquefaction of the steam included in gas by heat exchanger material at a low temperature is utilized, in addition to the heat of high heat gas such as flue gas. The latent heat is the thermal energy generated in phase transformation of the steam of gas to liquid after being cooled on the material surface. Thus, the steam of gas agglomerates on the surface of the heat exchanger material in the molecule level. In order to improve the thermal efficiency of the latent heat, it is direct to increase the surface area of the heat exchanger. One way to achieve that is simply increasing the size of the heat exchanging part. However, the approach is not applicable in most cases due to the limitation of its installation location or the cost. Therefore, it is preferable to increase the surface area of the heat exchanger. One example to achieve that is performing rough polishing on the surface of the heat exchanger. However, in polishing, the surface is rough and the valley part is deep, which causes the shortcoming of difficulty to discharge the formed condense water due to the surface tension. Accordingly, the inventors of the present invention found that both of formation and discharging of the condense water are stimulated by forming the extremely fine Al oxides or Ti and Al oxides, as a way: to remove droplets of the formed condense water quickly from the surface of the heat exchanger; and to increase the surface area. The details of the mechanism of this phenomenon are under investigation still, but are assumed that: the extremely fine roughness of these oxides increase the surface area and become the start points of formation of the condense water in the molecule level; and discharging from the surface is stimulated when the condense water grows into the size of the droplet level by its own surface tension. Specifically, the inventors of the present invention found that it is preferable that the surface roughness in Ra measured by red laser is 0.010 μm to 0.15 μm.

Thus, in the present invention, it is configured that the surface roughness in Ra measured by red laser is 0.010 μm to 0.15 μm.

Even if the surface roughness exceeded 0.15 μm, the capture efficiency of the condense water would increase further. However, in the case where the surface roughness exceeding 0.15 μm, the oxides formed on the surface have an adverse effect on brazing property. Therefore, the value is set as the upper limit.

Next, the corrosion resistance of the (2) above is explained. It is known that the aluminum oxide or titanium and aluminum oxide has high corrosion resistance. However, in the stainless steel used as the heat exchanger, if there a large amount of these oxides were formed on the surface, the brazing property, which is explained later, would be deteriorated. Thus, in terms of the aluminum oxide or titanium and aluminum oxide formed on the surface of the stainless steel, the inventors of the present invention conducted extensive studies about the minimally required morphology and thickness capable of contributing to improvement of the corrosion resistance. As a result, they found that there is no need for the aluminum oxide or titanium and aluminum oxide to cover the entire surface of the stainless steel completely in order to improve the corrosion resistance needed for the device. Specifically, they found that it can be achieved by configuring that: the required surface coverage ratio by the oxide is 5% to 70%; and the thickness from the surface to a point, which includes the value of a half peak of the Al content or the Ti and Al content on the surface, satisfies 5 to 300 nm, the value of a half peak of the Al content or the Ti and Al content being obtained from the elemental profile expressed by the cation ratio, and the Al content or the Ti and Al content on the surface being one of higher one.

Therefore, in the present invention, it is configured that: the Al oxides or the Ti and Al oxides are present on the surface of the material; the surface coverage ratio by the Al oxide is 5% to 70%; and the thickness from the surface to the point, which includes the value of a half peak of the Al content or the Ti and Al content on the surface, satisfies 5 to 300 nm, the value of a half peak of the Al content or the Ti content being obtained from an elemental profile expressed by the cation ratio.

Next, the brazing property of the (3) above is explained. It is known that formation of oxides of Ti, Al, or the like, which is more likely to be oxidized than Cr, formed on the surface of the material has an adverse effect on the brazing property depending on the type of the brazing material. Then, after conducting extensive studies about the Ti and Al about the condition causing the adverse effect on the brazing property, they found that the brazing property is decreased when the oxides of Ti and/or Al are formed at the temperature lower than the temperature at which the brazing material is melted during brazing. Moreover, they found that it is important to keep the degree of vacuum at less than $1 \times 10^{-2}$ Pa until the temperature reaches to 400° C. during heating for the improvement of the brazing property. In addition, they found that, after the brazing material is melted, the impact of the formation of oxides of Ti and/or Al on the material surface on the brazing property is small; and further found that trace oxides of Ti and/or Al are formed on the surface layer by reducing the degree of vacuum a bit in the soak temperature range in which the temperature of the brazing material reaches to the melting point or higher to obtain the atmosphere in which Ti and/or Al are likely to be oxidized.

The inventors of the present invention found that brazing can be done while the properties of (1) and (2) are retained, by controlling the thickness of the coating film though the above-described atmosphere in brazing in addition to the optimization of the amounts of Ti and Al.

Based on the above-described results, the content amounts of Al and Ti in the steel is configured as described below. In terms of the component content, % means mass %.

Al is an important element in the present invention; and forms fine oxides during brazing heat treatment to improve wettability against the condense water. In addition, it is important as a deoxidizing element, and has effect of miniaturizing the structure by controlling the composition of the non-metal inclusions. However, if it were added excessively, it would not only reduce the brazing property, but would also lead to coarsening of the non-metal inclusions as the material itself, possibly becoming the starting points of occurrence of scratches on the product. Therefore, the lower and upper limits are set to 0.003% and 0.30%, respectively. Preferably, it is in the range of 0.005% to 0.20%. More preferably, it is in the range of 0.008% to 0.15%.

In the case where Ti is added, Ti is very important element suppressing the intergranular corrosion and improving workability by fixing C and N together with Nb in the welded part of the ferritic stainless steel generally. Furthermore, it is an important element to improve wettability against the condense water for improving the heat exchanger properties together with Al in the corrosion environment. Ti forms the surface coating film of the stainless steel with Cr, and very effective on suppressing formation of the pitting corrosion. However, excessive addition of Ti, which reduces the brazing property, causes formation of surface scratches in production. Thus, in the case where Ti is added, the range of the Ti content is set to 0.001% to 0.30%. Preferably, is in the range of 0.07% to 0.26%. More preferably, it is in the range of 0.08% to 0.22%.

The above-described effects of the present invention were confirmed by performing the experiments below. As materials, 11 types of ferritic stainless steel, in which the Cr contents were 18% to 19% and the Al contents were varied as shown in Nos. 1 to 11 in Table 1; and the SUS316L austenitic stainless steel, which is shown in No. 12 in Table 1 and a comparative material, were produced by vacuum melting. The contents of other components of the ferritic stainless steels were kept in the almost constant values within the ranges in the present invention, which are described below.

One-point-five mm thick steel plates were produced from the above-described materials by performing grinding removal of scales and by cold rolling after rolling into the thickness of 4 mm by forging and hot rolling, and performing the heat treatment at 980° C. for 1 minute. Then, they were subjected to the heat treatment as the final annealing: in the condition at 950° C. to 1000° C. for 1 minute for the samples Nos. 1 to 11; and in the condition at 1100° C. for 1 minute for the austenitic stainless steel No. 12, based on each of recrystallization behaviors. After removing the scales formed in the heat treatment by performing pickling removal, the #1000 wet polishing treatments were performed to obtain the sample materials.

Then, the obtained sample materials were subjected to the treatment under the identical condition described below as the heat treatment simulating the brazing treatment. The heat treatment was performed by using a vacuum furnace in the condition of: the degree of vacuum until the temperature reached to 400° C. being $2 \times 10^{-3}$ Pa; the soaking temperature being 1100° C.; and the soaking time being 10 minutes. When the temperature reached to the soaking temperature, the degree of vacuum was adjusted to $1 \times 10^{0}$ Pa The coverage ratio of the surface oxide formed in the heat treated samples was evaluated as the area ratio of the oxide, by using the Auger photometric spectrometer, AES, manufactured by Shimadzu Corporation; performing element mapping for Ti and Al on the outermost layer in the view field magnified 2000-times; and binarizing the obtained image into the oxide and other by an image analysis software. The highest concentrations of Al and Ti on the surface were measured by using AES in the same way, and measuring the depth profile of the elements. The oxide depth was defined as the depth in which the concentration of Al or Ti decreased to the value of a half peak of the highest concentration of Al or Ti.

The surface roughness was measured by using the red laser microscope VK8550 manufactured by Keyence Corporation in the measurement magnification of 2000 times. The measurement of the surface roughness was performed in the measurement direction parallel to the polishing mark or the rolling direction as the two-dimensional roughness longer than 100 μm; and the average roughness Ra/μm was defined as the index parameter. The reason for setting the measurement direction to the polishing mark or the rolling direction was to exclude the effect of unevenness of the polishing mark and the rolling roll mark as much as possible. In the analysis, the software VK8500 supplied with the equipment was used. In order to correct the effect of the shapes of the samples, smoothing and inclination correction of the supplied analysis software were performed appropriately.

In the measurement the amount of the captured condense water, the method described below was used. The amount of the captured condense water was obtained by using a general gas hot water supply device free of a latent heat recovery function; exposing the heat treated material to the front side of the exhaust port in supplying hot water in the state where the temperature setting of the hot water was fixed in the constant level; and measuring the amount of droplets adhered on the surface from the mass change before and after the exposure. Specifically, the experiment was performed in a day of cloudy weather in the condition of: the temperature of the hot water being 50±2° C. (the actual observed value; the gas hot water supply device was the type in which the temperature was set by rotating a dial, and not the type in which the set temperature was directly input); the outside air temperature being 10±2° C.; and the relative humidity being 60% to 70%. The samples were ones on which above-described heat treatment was performed having the dimension of 1.5t×20×120 mm. The fixing jig was placed in front of the exhaust port of the hot water supply device in such a way that the above-described samples could be placed with the 30 mm interval perpendicular to the exhaust port. Then, the hot water supply device turned on to burn; the samples were placed in the state where the temperature was constant; and the samples were taken off after 10 seconds. At this time, each of the samples was put in a plastic bag, which was weighted in advance and had a snap, immediately in order to avoid evaporation of the condense water by the outside air; and mass change before and after the testing was measured. The samples before the testing were subjected to acetone degreasing treatment at the temperature equivalent to the outside air. Time was set to 10 seconds since if it exceeded 10 seconds, the temperature of the samples themselves would increase; and the condense water started to evaporate. The amount of captured condense water was expressed based on the comparative material SUS316L, expressing it as B; A,; and C, when improvement against SUS316L was 10% to 50% (exclusive); more than 50%; and less than 10%, respectively.

The corrosion resistance of the heat treated materials was evaluated by the wet and dry test using the simulated condense water. As testing materials, samples, which were subjected to the #1000 wet polishing treatments on their entire surfaces; had the dimension of 1.5t×15×50 mm; and were heat treated in the same condition as the one for the above-described brazing material, were used. The testing solutions included: 100 ppm of nitrate ion $NO^{3-}$; 10 ppm of sulfate ion $SO4^{2-}$; and 100 ppm of chloride ion CV, and pH was 2.5. The reason for setting the concentration of CL to 100 ppm was for comparing the corrosion weight loss between steel types and setting the corrosion condition to a harsher condition. Fifty ml volume testing tube was filled with 10 ml of the testing solution; and each type of the heat treated stainless steels was semi-submerged. Then, one cycle consisting of the steps of: keeping the testing samples in a water bath at 80° C. for 24 hours; taking the samples off from the solutions to dry completely; lightly washing the dried samples by distilled water; filling other testing tubes with the testing solution in the same manner; semi-submerging the samples in the testing tubes; and keeping them at 80° C. for 24 hours, was repeated 14 times. After completion of the repetition, the corrosion loss was evaluated, and the corrosion resistance was graded as B, A, and C, when it was 1 g·m$^{-2}$ or more and less than 5 g·m$^{-2}$; less than 1 g·m$^{-2}$; and more than 5 g·m$^{-2}$, respectively.

The brazing property was evaluated based on the extent of flow of Ni brazing into the crevice part. The sample materials were two sheets of the #1000 wet polishing treatments, one of which had the dimensions of 1.5t×30×100 mm and the other had the dimensions of 1.5t×20×80 mm. The two sheets were stacked having each of the centers was overlapped each other; and spot welding for temporary fixation was performed at two locations. Then, 0.2 g of Ni brazing material in a paste form, which corresponded to the JIS B-Ni5, was applied on the crevice part on the center of the short side of the sample having the dimension of 20×40 mm. The heat treatment condition for brazing was set as described above.

The brazing property was evaluated as A, B, and C, when the brazing material reached in the entire crevice part; when the brazing material did not reached in the entire crevice part but flew in 95% or more of the crevice length; when the flow of the brazing material was evidently discontinued on the way, respectively. In the evaluation, cross-sections were cut out in parallel on the central part in the short side direction of the sample; and the length of existing brazing material in the crevice part in the cross-section was observed by a microscope with 20 time magnification. It was confirmed that the interval of the crevice part was less than 0.1 μm based on observation of the cross-section of the sample after brazing in each case.

| | | | | Production process | | | | | |
|---|---|---|---|---|---|---|---|---|---|
| | Component content (mass %) | | | Extent of vacuum (400° C.) | Soaking temperature | Extent of vacuum after soaking | Surface component | | Surface oxide Coverage ratio |
| No. | Cr | Al | Ti | (Pa) | (° C.) | (Pa) | $S_{Al}$ (%) | $A_{Ti}$ (%) | (%) |
| 1 | 18.9 | 0.002 | — | 2 × 10$^{-3}$ | 1100 | 1 × 10$^0$ | 1 | — | 1 |
| 2 | 18.6 | 0.012 | — | 2 × 10$^{-3}$ | 1100 | 1 × 10$^0$ | 6 | — | 6 |
| 3 | 19.1 | 0.031 | — | 2 × 10$^{-3}$ | 1100 | 1 × 10$^0$ | 13 | — | 13 |
| 4 | 19.3 | 0.115 | — | 2 × 10$^{-3}$ | 1100 | 1 × 10$^0$ | 59 | — | 59 |
| 5 | 19.0 | 0.320 | — | 2 × 10$^{-3}$ | 1100 | 1 × 10$^0$ | 75 | — | 75 |

-continued

| | | | | | | | | | |
|---|---|---|---|---|---|---|---|---|---|
| 6 | 18.8 | 0.020 | 0.08 | $2 \times 10^{-3}$ | 1100 | $1 \times 10^0$ | 6 | 5 | 11 |
| 7 | 19.2 | 0.017 | 0.14 | $2 \times 10^{-3}$ | 1100 | $1 \times 10^0$ | 8 | 19 | 27 |
| 8 | 18.9 | 0.022 | 0.20 | $2 \times 10^{-3}$ | 1100 | $1 \times 10^0$ | 7 | 36 | 43 |
| 9 | 18.7 | 0.019 | 0.33 | $2 \times 10^{-3}$ | 1100 | $1 \times 10^0$ | 8 | 66 | <u>74</u> |
| 10 | 18.4 | 0.051 | 0.11 | $2 \times 10^{-3}$ | 1100 | $1 \times 10^0$ | 22 | 20 | 42 |
| 11 | 18.6 | 0.160 | 0.26 | $2 \times 10^{-3}$ | 1100 | $1 \times 10^0$ | 42 | 39 | <u>81</u> |
| 12 | 18.0(10Ni-2Mo) | — | — | $2 \times 10^{-3}$ | 1100 | $1 \times 10^0$ | <1 | <1 | <u><1</u> |
| 13 | 18.4 | 0.051 | 0.11 | $1 \times 10^{-1}$ | 1100 | $1 \times 10^0$ | 30 | 48 | <u>78</u> |
| 14 | 18.4 | 0.051 | 0.11 | $1 \times 10^{-2}$ | 1100 | $1 \times 10^0$ | 25 | 42 | 67 |
| 15 | 18.4 | 0.051 | 0.11 | $2 \times 10^{-3}$ | 1100 | $5 \times 10^{-3}$ | 1 | 3 | <u>4</u> |
| 16 | 18.4 | 0.051 | 0.11 | $2 \times 10^{-3}$ | 1100 | $5 \times 10^1$ | -(Mainly Fe oxide) | | |
| 17 | 18.4 | 0.051 | 0.11 | No heat treatment (#1000 polish) | | | <1 | <1 | <u><1</u> |
| 18 | 18.4 | 0.051 | 0.11 | No heat treatment (#80 polish) | | | <1 | <1 | <u><1</u> |
| 19 | 18.4 | 0.051 | 0.11 | $0.5 \times 10^{-2}$ | | | 17 | 27 | 44 |

| | | | Quality evaluation | | | | |
|---|---|---|---|---|---|---|---|
| No. | Surface oxide Thickness (μm) | Roughness Ra (μm) | Amount of captured condense water (g/m²) | Corrosion test | Brazing property | | |
| 1 | <u>3</u> | <u>0.007</u> | 1.04 | C | C | A | Comparative Example |
| 2 | 60 | 0.012 | 1.32 | B | B | A | Present invention |
| 3 | 120 | 0.029 | 1.51 | A | A | A | Present invention |
| 4 | 250 | 0.085 | 1.68 | A | A | B | Present invention |
| 5 | <u>460</u> | <u>0.189</u> | 1.30 | B | A | C | Comparative Example |
| 6 | 110 | 0.015 | 1.42 | B | B | A | Present invention |
| 7 | 180 | 0.039 | 1.51 | A | A | A | Present invention |
| 8 | 240 | 0.105 | 1.66 | A | A | B | Present invention |
| 9 | <u>330</u> | <u>0.175</u> | 1.32 | B | A | C | Comparative Example |
| 10 | 190 | 0.110 | 1.61 | A | A | B | Present invention |
| 11 | <u>550</u> | <u>0.221</u> | 1.41 | B | A | C | Comparative Example |
| 12 | <u><1</u> | 0.006 | 0.98 | C | C | A | Comparative Example |
| 13 | <u>390</u> | <u>0.180</u> | 1.35 | B | B | C | Comparative Example |
| 14 | <u>310</u> | <u>0.160</u> | 1.31 | B | A | C | Comparative Example |
| 15 | <u>4</u> | <u>0.009</u> | 1.02 | C | C | A | Comparative Example |
| 16 | <u>800</u> | <u>0.255</u> | 1.36 | B | C | C | Comparative Example |
| 17 | — | <u>0.008</u> | 0.97 | C | C | — | Comparative Example |
| 18 | — | <u>0.35</u> | 1.19 | B | C | — | Comparative Example |
| 19 | 220 | 0.120 | 1.40 | B | A | B | Present invention |

The relationships are shown in Table 1. In Table 1 and Table 2, which is described below, configurations out of the range of the scope of the present invention are underlined. First, in Comparative Example No. 12, the Ti, Al oxide coating film was not formed on the surface even after the heat treatment, since it was austenitic stainless steel and the contents of Ti and Al were extremely low. The amount of the captured condense water in this material was 0.98 g·m$^{-2}$; and the corrosive weight loss in the corrosion test exceeded 10 g·m$^{-2}$; and inferior to Examples of the present invention. In terms of brazing property, the crevice part was completely filled, and the brazing property was excellent.

Next, effects of the Al concentration in steel are shown in Nos. 1 to 5. Even in the ferritic stainless steel, when the Al content in the material was less than the predetermined value as in No. 1, both of the coverage ratio and thickness of the Al oxide on the surface after performing the predetermined heat treatment were low; and the roughness Ra was low. In addition, the amount of the captured condense water was equivalent to the level in No. 12 in the testing; and the amount of corrosion was high in the corrosion test since it had no coating film formation. On the other hand, in Nos. 2 to 4, in which the Al content was in the scope of the present invention, the coverage ratio and oxide thickness of the Al oxide were increased in the same range of heat treatment to be in the scope of the present invention. The amount of the captured condense water increased more than 10% compared to No. 12 in the testing. In addition, the amount of corrosion was low in the corrosion test and excellent. In addition, the brazing property in the crevice part was excellent. In No. 5, in which the Al content exceeded the scope of the present invention, the coverage ratio of the Al oxide exceeded 70%, and the thickness of the coating film on the surface exceeded 300 nm. Thus, the corrosion resistance was secured, but the brazing property, which was one of important characteristics as the heat exchanger component, was reduced significantly.

Next, the cases where Al and Ti were added to steel are shown in Nos. 6 to 11. When the contents of Al and Ti were in the appropriate range, the surface coverage ratio and the coating film thickness of the Al and Ti oxide were increased in the atmosphere condition in the present invention. In addition, excellent results in both of the amount of the captured condense water; and the corrosion resistance, were obtained. On the other hand, in No. 9, in which the content of Ti was out of the scope of the present invention; and in No. 11, in which the coverage ratio was out of the scope of the present invention due to both of the contents of Al and Ti being too close to their upper limits, the corrosion resistance was secured, but the brazing property, which was one of important characteristics as the heat exchanger component, was reduced significantly.

Next, the effect of the heat treatment atmosphere was investigated. Specifically, the investigation was performed in the condition where No. 10 in Table 1 was used as the testing material; and the degree of vacuum until the temperature reached to 400° C. during heating in the heat treatment was reduced to: $1 \times 10^{-1}$ Pa; $1 \times 10^{-2}$ Pa; and $0.5 \times 10^{-2}$ Pa. Results are shown in Nos. 13 to 14, and 19 in Table 1. The lower the degree of vacuum during heating, the earlier the initiation of oxidation on the surface before melting of the brazing material. Thus, Ti and Al were enriched excessively on the surface, and the brazing property was reduced. In addition, in order to investigate the effect of the atmosphere in the soaking temperature range, only the degree of vacuum at the soaking temperature was changed by using the testing material No. 10 shown in Table 1. As a result, in No. 15, in which the degree of vacuum in the soaking temperature was kept at high vacuum of $5 \times 10^{-3}$ Pa, formation of Ti and Al oxide was suppressed; and the brazing property was excellent. However, the corrosion resistance and the ratio of capturing the condense water were not particularly improved compared to No. 10 formed in the condition in the scope of the present invention. When the degree of vacuum in the soaking temperature was decreased to $5 \times 10^{1}$ Pa, the surface had the darkest brown color in the appearance; Ti and Al were not detected on the surface layer in the coating film, and the coating film composition was mainly Fe oxide predominantly. Because of this, the corrosion resistance in No. 15 was significantly reduced compared to No. 10 formed in the condition in the scope of the present invention.

Finally, in order to demonstrate the effect of the surface shape, samples were compared to the materials subjected to polishing treatment. Specifically, by using the testing material of No. 10, the polishing treatment was performed by using wet emery papers having grit sizes of #1000 or #80 as variation. Roughness Ra in each was about 0.008 µm and 0.35 µm. These polished materials were subjected to each of evaluations without performing the heat treatment. Therefore, these samples were no comparable in terms of the brazing property. The results are shown in Nos. 17 and 18 in Table 1. Among these polished samples, the ratio of capturing the condense water was higher in the rougher #80 polishing than in the #1000 polishing. However, in both samples, the ratio of capturing the condense water was lower than those the heat treatment was performed on; and the corrosion resistance was poor too, since there was no Ti and Al coating film formed on the surface.

Based on results explained above, it was demonstrated that the ferritic stainless steel showing excellent properties as the heat exchanger could be provided by performing the appropriate heat treatment.

Explanations of other elements in this stainless steel are described below.

Cr is the most important element for securing the corrosion resistance of the stainless steel. It is necessary that Cr is included at least in 13% in the usage condition since it stabilizes the ferritic structure. The higher the Cr content, the higher the corrosion resistance. However, extensively high Cr content reduces workability and manufacturability. Thus, the upper limit of Cr is set to 25%. Preferably, the Cr content is set in the range of 14.0% to 24.0%. More preferably, is 16.5% to 23.5%.

Si can be added as a deoxygenating element and effective on the corrosion resistance and the oxidation resistance, generally. However, Si not only has the action stimulating proceeding of corrosion in the condition; but excessively added Si reduces workability and manufacturability. Intrinsically, Si is an element of reactive to oxygen. However, when Al and Ti, which are more active, exist, the degree of oxidation is low in the heat treatment condition in the present invention. However, when the amounts of Al and Ti are relatively low, Si is oxidized on the surface, which is not preferable. Thus, the Si content is set to 1.0% or less. Preferably, it is 0.50% or less. More preferably, it is in the range of 0.05% to 0.3%. Si may be not included.

C has effects of improving the strength, suppressing coarsening of crystal grains in combination with the stabilizing elements, and the like. However, it reduces the intergranular corrosion resistance and workability. In the highly pure ferritic stainless steel, it is necessary for the C content to be reduced. Thus, the upper limit of the C content is set to 0.030%. Excessive reduction of C deteriorates the refining cost. Thus, preferably, it is in the range of 0.002% to 0.015%.

There is a need for reducing the C content, since extensive addition of N reduces the intergranular corrosion resistance and workability as in the case in C. Thus, the upper limit of N is set to 0.030%. However, reducing the N content at an extreme level deteriorates the refining cost. Thus, preferably, the N content is in the range of 0.002% to 0.020%

Mn can be added as a deoxidizing element. However, extensive addition of Mn causes possible MnS formation, which becomes the starting point of corrosion; and destabilization of the ferritic structure. Thus, the Mn content is set to 1.0% or less. Preferably, it is in the range of 0.05% to 0.3%. Mn may be not included.

There is a need for reducing the P content, since extensive addition of P not only reduces weldability and workability, but also makes it easier for the intergranular corrosion to occur. Thus, the P content is set to 0.05% or less. Preferably, it is in the range of 0.001% to 0.04%.

There is a need for reducing the S content, since extensive addition of S causes formation of water-soluble inclusions, which become the starting points of corrosion due to the above-described CaS, MnS, or the like. Thus, the S content is set to 0.01% or less. However, reducing the S content at an extreme level deteriorates the refining cost. Thus, preferably, the S content is in the range of 0.0001% to 0.006%.

In addition, other chemical compositions, which can be optionally added in the present invention, are explained in detail below.

Nb is an element having the effect of suppressing granular corrosion in the welded part to improve workability by fixing C and N as in the case of Ti, and added if necessary. However, extensive addition of Nb reduces workability.

Thus, the Nb content is set in the range of 0.05% to 1.0%. Preferably, it is in the range of 0.1% to 0.5%.

Mo is an element having the effect of repairing the passivation film and a very effective element for improving corrosion resistance. Particularly, Mo has the effect of improving the pitting corrosion resistance in the combination with Cr. Thus, when Mo is added, it is preferable that Mo is included at 0.3% or more. By increasing the Mo content, the corrosion resistance is improved. However, extensive addition of Mo reduces workability and increases the cost. Thus, the upper limit of the Mo content is set to 3%. Preferably, the Mo content is in the range of 0.4% to 2.0%. More preferably, it is in the range of 0.80% to 1.6%.

Cu can be included in the ferritic stainless steel at 0.01% or more as inevitable impurities when scraps are used as the material. Cu has an effect of slowing corrosion rate when corrosion has progressed. When Cu is added, it is preferable that the Cu content is in the range of 0.10% to 1.0%. However, extensive addition of Cu reduces workability and is not preferred. Thus, preferably, it is in the range of 0.20% to 0.50%.

Ni slows the active dissolution rate and is very effective on passivation. Thus, Ni is added at 0.1% or more if necessary. However, extensive addition of Ni reduces workability. In addition, it not only destabilizes the ferritic structure, but also deteriorates the cost. Thus, the upper limit of the Ni content is set to 2.0%. Preferably, it is in the range of 0.30% to 1.5%. More preferably, it is in the range of 0.32% to 1.20%.

Each of Sn, Sb, Zr, Co and W may be added in order to improve the corrosive resistance if necessary. These elements are important elements for slowing the corrosion rate. However, extensive addition of these elements deteriorates the manufacturability and the cost. Thus, the contents are set in the range of 0.005% to 0.5% in any of these elements. Preferably, they are in the range of 0.05% to 0.4%.

B is a grain boundary strengthening element that is effective on improving the secondary working embrittlement. Thus, it may be added if necessary. However, extensive addition of B strengthens solid solution of ferrite to cause decrease in ductility. Thus, the upper and lower limits are set to 0.0001% and 0.0030%, respectively. Preferably, the B content is set in the range of 0.0002% to 0.0020%.

By adding V, the corrosion resistance and the crevice corrosion resistance are improved. In addition, by adding V with reduced amounts of Cr and Mo, excellent workability can be secured. Thus, V may be added if necessary. However, extensive addition of V not only reduces workability, but also saturates the effect of improving the corrosion resistance. Thus, the lower and upper limits are set to 0.03% and 1.0%, respectively. Preferably, it is in the range of 0.05% to 0.50%

Mg behaves as a deoxidizer by forming Mg oxides with Al in molten steel and as crystallization nuclei of TiN. The TiN becomes solidification nucleus of the ferrite phase during the solidification process and stimulates crystallization of TiN to form the fine ferrite phases in solidification. By miniaturizing the solidified structure, formation of surface defects due to the coarse solidified structure, such as ridging, roping, and the like, can be prevented; and it also contributes to improvement of workability. Thus, Mg may be added if necessary. When Mg is added, the Mg content is set to 0.0001%, at which the above-described effects are exerted. However, if it exceeded 0.0050%, manufacturability would deteriorate. Thus, the upper limit of the Mg content is set to 0.0050%. Preferably, it is in the range of 0.0003% to 0.0020% in consideration of the manufacturability.

Addition of each of La, Y, Hf, and REM improves hot workability and the index of cleanliness of steel; and they are effective element for the improvement of the corrosion resistance in the present invention. Thus, any one of these may be added if necessary. When one of them is added, the content is set to 0.001%, at which each of the above-described effects is exerted. However, extensive addition of these elements causes increase in alloy cost and reduction of manufacturability. Thus, the upper limit of each of these elements is set to 0.1%. Preferably, it is in the range of 0.001 to 0.05% solely or combination of two kinds or more in consideration of: cost-effectiveness and manufacturability. REM are elements having atomic numbers of 57 to 71 and includes La, Ce, and Nd, for example.

Ga is an element contributing to improvement of workability. It may be added in the range of 0.001% to 0.05%.

Ca is an element improving oxidation resistance in a trace amount and may be added in the range of 0.0001% to 0.0050%.

In addition to the above-described elements, other elements may be added in the range that does not impair the effects of the present invention.

The method of producing the ferritic stainless steel of the present invention is explained below. By using the steel plate containing the steel components defined in the present invention; setting a degree of vacuum less than $1 \times 10^{-2}$ Pa until temperature reaches 400° C. during heating; performing a heat treatment at a soaking temperature of 900° C. to 1200° C. for a soaking time of 120 minutes or less; and adjusting the degree of vacuum to $10^{-2}$ Pa to $10^1$ Pa after the temperature reaches to the soaking temperature, the ferritic stainless steel of the present invention is produced. In the ferritic stainless steel of the present invention, one or both of the aluminum oxide or titanium and aluminum oxide are present on the surface of the material; the surface coverage ratio by the Al oxide is 5% to 70%; the surface roughness in Ra measured by red laser is 0.010 μm to 0.15 μm; and the thickness from the surface to the point, which includes the value of a half peak of an Al content or an Ti content on the surface, satisfies 5 to 300 nm, the value of a half peak of the Al content or the Ti content being obtained from the elemental profile expressed by the cation ratio. It is preferable that the soaking time is set to 1 minute or more. When Ti and Al are included in the steel and both of the Ti and Al contents are in the range of the present invention but close to their upper limits at the same time, it is possible that: the coverage ratio of the surface oxide exceeds 70%, which is the upper limit in the present invention; or the thickness of the oxide layer exceeds 300 nm, which is the upper limit in the present invention. In such a case, by reducing the Ti or Al content within the ranges in the present invention, the coverage ratio and/or the thickness of the surface oxide can be adjusted in the ranges in the present invention.

The ferritic stainless steel of the present invention may be used for a heat exchanger. In addition, it may be configured that the ferritic stainless steel of the present invention is included in a heat exchanger as a component. This is because the ferritic stainless steel of the present invention has excellent heat exchange properties; corrosion resistance; and brazing property, as described above.

EXAMPLES

TABLE 2

| No | Component content (mass %) (ppm in part) | | | | | | | | | | |
|---|---|---|---|---|---|---|---|---|---|---|---|
| | C | Si | Mn | P | S | Cr | Al | N | Nb | Ti | Other |
| 20 | 0.015 | 0.30 | 0.21 | 0.020 | 0.002 | 18.1 | 0.046 | 0.011 | — | — | |
| 21 | 0.005 | 0.14 | 0.12 | 0.019 | 0.001 | 17.0 | 0.037 | 0.009 | — | 0.18 | |
| 22 | 0.007 | 0.20 | 0.15 | 0.019 | 0.001 | 22.2 | 0.018 | 0.010 | — | 0.27 | Ni: 0.5 |
| 23 | 0.010 | 0.22 | 0.14 | 0.020 | 0.001 | 16.1 | 0.034 | 0.009 | 0.32 | — | |
| 24 | 0.007 | 0.12 | 0.20 | 0.020 | 0.001 | 23.4 | 0.020 | 0.011 | 0.35 | — | |
| 25 | 0.007 | 0.35 | 0.20 | 0.020 | 0.001 | 19.2 | 0.045 | 0.012 | 0.45 | — | |
| 26 | 0.004 | 0.15 | 0.12 | 0.021 | 0.001 | 18.6 | 0.045 | 0.011 | 0.25 | — | Mo: 0.6 |
| 27 | 0.009 | 0.17 | 0.20 | 0.018 | 0.001 | 17.5 | 0.080 | 0.013 | 0.36 | — | Ni: 0.32 |
| 28 | 0.007 | 0.25 | 0.15 | 0.017 | 0.001 | 18.6 | 0.033 | 0.012 | 0.40 | — | Mo1.6, V: 0.15 |
| 29 | 0.004 | 0.12 | 0.15 | 0.017 | 0.001 | 19.9 | 0.016 | 0.010 | 0.20 | 0.12 | Ni: 0.27, Cu: 0.41 |
| 30 | 0.007 | 0.20 | 0.12 | 0.002 | 0.001 | 22.2 | 0.033 | 0.013 | 0.29 | 0.09 | |
| 31 | 0.003 | 0.26 | 0.15 | 0.020 | 0.001 | 18.7 | 0.052 | 0.010 | 0.17 | 0.15 | Mo: 0.9 |
| 32 | 0.011 | 0.22 | 0.20 | 0.025 | 0.001 | 22.9 | 0.101 | 0.014 | 0.25 | 0.09 | Mo: 0.5, Ni: 0.6 |
| 33 | 0.007 | 0.20 | 0.15 | 0.021 | 0.001 | 14.1 | 0.020 | 0.009 | 0.10 | 0.20 | Sn: 0.05, Sb: 0.05 |
| 34 | 0.004 | 0.20 | 0.12 | 0.020 | 0.001 | 16.5 | 0.031 | 0.008 | 0.22 | 0.09 | Sn: 0.1, REM: 0.01 |
| 35 | 0.012 | 0.25 | 0.15 | 0.022 | 0.001 | 18.9 | 0.120 | 0.011 | 0.40 | 0.21 | Mo: 0.89, B: 8 ppm |
| 36 | 0.005 | 0.19 | 0.19 | 0.017 | 0.001 | 23.5 | 0.008 | 0.012 | 0.19 | 0.15 | Mo: 0.51, V: 0.3, |
| 37 | 0.008 | 0.09 | 0.25 | 0.015 | 0.001 | 19.2 | 0.015 | 0.011 | 0.20 | 0.17 | Co. W: 0.1, REM: 0.01 |
| 38 | 0.004 | 0.10 | 0.19 | 0.016 | 0.001 | 23.4 | 0.042 | 0.013 | 0.45 | 0.08 | La, Y, IIf: 0.01 |
| 39 | 0.006 | 0.12 | 0.11 | 0.020 | 0.001 | 19.0 | 0.060 | 0.014 | 0.30 | 0.11 | Zr: 0.2, V0.12, Mg: 9 ppm |
| 40 | 0.012 | 0.19 | 0.15 | 0.022 | 0.002 | 21.1 | 0.055 | 0.015 | 0.45 | | Mo: 0.8, Ca: 16 ppm |
| 41 | 0.005 | 0.20 | 0.25 | 0.020 | 0.001 | 18.9 | 0.029 | 0.010 | 0.29 | 0.10 | Ni: 0.4, Ga: 0.01%, V: 0.04% |
| 42 | 0.008 | 0.14 | 0.19 | 0.030 | 0.003 | 12.4 | 0.050 | 0.009 | 0.29 | 0.16 | |
| 43 | 0.005 | 0.27 | 0.15 | 0.020 | 0.001 | 17.5 | 0.002 | 0.012 | 0.36 | — | |
| 44 | 0.007 | 0.21 | 0.14 | 0.030 | 0.001 | 18.7 | 0.510 | 0.009 | 0.15 | 0.19 | Mo: 0.49 |
| 45 | 0.011 | 0.18 | 1.14 | 0.020 | 0.003 | 18.0 | 0.001 | 0.012 | 0.01 | 0.03 | Mo: 2.0, Ni: 10.1 |

| | Surface component | | Surface oxide | | Roughness | Quality evaluation | | | |
|---|---|---|---|---|---|---|---|---|---|
| | | | Coverage | | | Amount of captured condense | | | |
| No | $S_{Al}$ (%) | $A_{Ti}$ (%) | ratio (%) | Thickness (μm) | Ra (μm) | water (g/m$^2$) | Corrosion test | Brazing property | |
| 20 | 19 | — | 19 | 50 | 0.025 | 1.39 | B | B | A | Present invention |
| 21 | 16 | 26 | 42 | 140 | 0.069 | 1.48 | B | B | A | Present invention |
| 22 | 9 | 40 | 49 | 190 | 0.084 | 1.55 | A | A | B | Present invention |
| 23 | 15 | — | 15 | 50 | 0.022 | 1.35 | B | B | A | Present invention |
| 24 | 12 | — | 12 | 40 | 0.013 | 1.31 | B | B | A | Present invention |
| 25 | 22 | — | 22 | 140 | 0.025 | 1.40 | B | B | A | Present invention |
| 26 | 21 | — | 21 | 80 | 0.022 | 1.31 | B | B | A | Present invention |
| 27 | 41 | — | 41 | 210 | 0.060 | 1.64 | A | B | B | Present invention |
| 28 | 14 | — | 14 | 60 | 0.015 | 1.30 | B | A | A | Present invention |
| 29 | 10 | 25 | 35 | 170 | 0.057 | 1.45 | B | A | A | Present invention |
| 30 | 13 | 29 | 42 | 220 | 0.075 | 1.55 | A | A | B | Present invention |
| 31 | 25 | 27 | 52 | 240 | 0.090 | 1.61 | A | A | B | Present invention |
| 32 | 33 | 19 | 52 | 230 | 0.091 | 1.51 | B | A | B | Present invention |
| 33 | 13 | 30 | 43 | 200 | 0.084 | 1.50 | B | B | B | Present invention |
| 34 | 14 | 21 | 35 | 150 | 0.050 | 1.33 | B | B | A | Present invention |
| 35 | 35 | 32 | 67 | 270 | 0.130 | 1.64 | A | A | B | Present invention |

TABLE 2-continued

| | | | | | | | | | | |
|---|---|---|---|---|---|---|---|---|---|---|
| 36 | 8 | 25 | 33 | 120 | 0.054 | 1.30 | B | A | A | Present invention |
| 37 | 9 | 27 | 36 | 130 | 0.064 | 1.31 | B | B | A | Present invention |
| 38 | 15 | 19 | 34 | 110 | 0.054 | 1.32 | B | A | A | Present invention |
| 39 | 33 | 22 | 55 | 190 | 0.099 | 1.54 | A | B | A | Present invention |
| 40 | 29 | | 29 | 180 | 0.060 | 1.42 | B | A | B | Present invention |
| 41 | 14 | 21 | 35 | 210 | 0.071 | 1.50 | B | A | B | Present invention |
| 42 | 19 | 25 | 44 | 150 | 0.087 | 1.41 | B | C | A | Comparative Example |
| 43 | 1 | <1 | 1 | 3 | 0.008 | 1.10 | C | C | A | Comparative Example |
| 44 | 55 | 32 | 87 | 380 | 0.210 | 1.28 | B | B | C | Comparative Example |
| 45 | <1 | 3 | 3 | <1 | 0.006 | 1.01 | C | C | A | Comparative Example |

Steels of Nos. 20 to 44 having the chemical compositions shown in Table 2 were produced in the standard method of producing high-purity ferritic stainless steel. Specifically, ingots having the thickness of 40 mm were produced after vacuum melting; and they were rolled into the thickness of 4 mm by hot rolling. Then, after performing heat treatment at 980° C. for 1 minute based on each of recrystallization behaviors, scales were removed by grinding; and steel plates having the thickness of 1.5 mm were produced by cold rolling. Then, they were subjected to the heat treatment as the final annealing in the condition at 900° C. to 1000° C. for 1 minute based on each of recrystallization behaviors, and subjected to the testing explained below. In No. 45, which corresponded to the austenitic stainless steel of SUS316L, the heat treatment temperature was set to 1100° C. "-" in the table means the element was not added or the measurement was not performed.

After performing pickling removal of heat treatment scales, they were subjected to #1000 wet polishing treatments to obtain the sample materials. As the heat treatment simulating the brazing, the treatment described blow was performed. The heat treatment was performed by using a vacuum furnace in the condition of: the degree of vacuum until the temperature reached to 400° C. being $2 \times 10^{-3}$ Pa; the soaking temperature being 1100° C.; and the soaking time being 10 minutes. When the temperature reached to the soaking temperature, the degree of vacuum was adjusted to $1 \times 10^0$ Pa Methods in measuring: the concentrations of the aluminum oxide or titanium and aluminum oxide on the surface after heat treatment; the coverage ratio of the oxide film; the thickness of the oxide film; and the surface roughness, were performed as in the testing shown in the above-described Table 1. In addition, the mount of the captured condense water; the corrosion test with repetitive dry-wet cycles; the brazing property in the formed crevice; and the like were evaluated in the same ways as in the above-described Table 1.

The results are shown in Table 2. In Nos. 20 to 41, in which: the composition of the material was in the range in the present invention; and the coverage ratio of the aluminum oxide or titanium and aluminum oxide, the thickness, and the surface roughness were in the ranges in the present invention, any one of the amount of the captured condense water, the corrosion test, and the brazing property, showed excellent property as a heat exchanger.

On the other hand, in No. 42, in which the Cr content was out of the range in the present invention, the corrosion weight loss was high since the corrosion resistance of the base material was inferior to one having appropriate Cr content, even if the Al coating film was formed in the defined configuration. In No. 43, in which the Al content was less than the lower limit of the range in the present invention, the corrosion resistance in the condense water was insufficient due to the insufficient formation of the Al coating film; and the ratio of capturing the condense water was poor. In No. 44, in which Al was added extensively, the Al and Ti coating film was formed extensively; the brazing property was reduced; and the ratio of capturing the condense water was not high. In Comparative Example No. 45, which corresponded to SUS316L, it had excellent brazing property. However, the Ti and Al coating film was not formed on the surface since the Ti and Al contents were out of the ranges in the present invention; and the ratio of capturing the condense water was reduced. In addition, the corrosion resistance was reduced under the harsh environment in the testing compared to the ferritic stainless steels having the corrosion amount in the range in the present invention.

Based on the results described above, it was demonstrated that a ferritic stainless steel for a heat exchanger having excellent heat treatment properties, corrosion resistance and brazing property can be provided according to the present invention.

INDUSTRIAL APPLICABILITY

The present invention is suitable as the material for a heat exchanger. Particularly, it is suitable for the heat exchanger that recovers the exhaust heat of the fuel gas and generates the corrosive condense water from the exhaust gas. Specifically, it is suitable as a secondary heat exchanger material of a latent heat recovery type hot water supply device of a gas hot water supply device, an exhaust heat recovery machine of an automobile, and an EGR. In addition, as the suitable location it is provided, it can be provided not only to a case of the heat exchanger body or a partition plate, but also to any material such as a heat exchanger pipe. In addition, this material similarly exhibits excellent properties not only in combustion exhaust gas of hydrocarbon fuel but also in dry/wet repeated environment which is widely exposed to a low pH solution containing nitrate ion, sulfate ion and the like. Specifically, it is suitable for: various types of heat exchangers; outdoor exterior materials exposed to acid rain environment; building materials; roofing materials; outdoor equipment; water/hot water storage tanks; household electrical appliances possibly exposed to various detergents; bath tubs; kitchen equipment; and other general purposes indoors and outdoors.

What is claimed is:

1. A ferritic stainless steel comprising, in mass %, C: 0.030% or less, N: 0.030% or less, Si: 1.0% or less, Mn: 1.0% or less, P: 0.05% or less, S: 0.01% or less, Cr: 13% to 25%, Al: 0.003% to 0.30%, Ga: 0.001% to 0.05%, and a balance comprising Fe and unavoidable impurities, wherein,
an Al oxide is present on a surface of the ferritic stainless steel,
a surface coverage ratio by the Al oxide, which is an area ratio of the Al oxide, is 5% to 70%,
a surface roughness of the ferritic stainless steel in Ra measured by red laser is 0.010 μm to 0.15 μm, and
a thickness of the Al oxide on the surface satisfies 5 to 300 nm, the thickness of the Al oxide is a thickness from the surface to a point in which an Al content is a value of a half peak of the Al content in an elemental profile expressed by a cation ratio.

2. A ferritic stainless steel comprising, in mass %, C: 0.030% or less, N: 0.030% or less, Si: 1.0% or less, Mn: 1.0% or less, P: 0.05% or less, S: 0.01% or less, Cr: 13% to 25%, Ti: 0.001% to 0.30%, Al: 0.003% to 0.30%, Ga: 0.001% to 0.05%, and a balance comprising Fe and unavoidable impurities, wherein,
an Al oxide and a Ti oxide are present on a surface of the ferritic stainless steel,
a surface coverage ratio by the Al oxide and the Ti oxide, which is an area ratio of the Al oxide and the Ti oxide, is 5% to 70%,
a surface roughness of the ferritic stainless steel in Ra measured by red laser is 0.010 μm to 0.15 μm, and
a thickness of the Al oxide and the Ti oxide on the surface satisfies 5 to 300 nm, the thickness of the Al oxide and the Ti oxide is a thickness from the surface to a point in which a higher content among an Al content and a Ti content is a value of a half peak of the content thereof in an elemental profile expressed by a cation ratio.

3. The ferritic stainless steel according to claim 1, further comprising, in mass %, one or more of Mo: 0.3% to 3%, Nb: 0.05% to 1.0%, Ni: 0.1% to 2.0%, Cu: 0.10% to 1.0%, Sn, Sb, Zr, Co, and W: 0.005% to 0.5%, V: 0.03% to 1.0%, B: 0.0001% to 0.0030%, Mg: 0.0001% to 0.0050%, La: 0.001% to 0.1%, Y: 0.001% to 0.1%, Hf: 0.001% to 0.1%, REM: 0.001% to 0.1%, and Ca: 0.0001% to 0.0050%.

4. A heat exchanger comprising the ferritic stainless steel according to claim 1.

5. The heat exchanger according to claim 4, wherein the ferritic stainless steel further comprises, in mass %, one or more of Mo: 0.3% to 3%, Nb: 0.05% to 1.0%, Ni: 0.1% to 2.0%, Cu: 0.10% to 1.0%, Sn, Sb, Zr, Co, and W: 0.005% to 0.5%, V: 0.03% to 1.0%, B: 0.0001% to 0.0030%, Mg: 0.0001% to 0.0050%, La: 0.001% to 0.1%, Y: 0.001% to 0.1%, Hf: 0.001% to 0.1%, REM: 0.001% to 0.1%, and Ca: 0.0001% to 0.0050%.

6. The ferritic stainless steel according to claim 2, further comprising, in mass %, one or more of Mo: 0.3% to 3%, Nb: 0.05% to 1.0%, Ni: 0.1% to 2.0%, Cu: 0.10% to 1.0%, Sn, Sb, Zr, Co, and W: 0.005% to 0.5%, V: 0.03% to 1.0%, B: 0.0001% to 0.0030%, Mg: 0.0001% to 0.0050%, La: 0.001% to 0.1%, Y: 0.001% to 0.1%, Hf: 0.001% to 0.1%, REM: 0.001% to 0.1%, and Ca: 0.0001% to 0.0050%.

7. A heat exchanger comprising the ferritic stainless steel according to claim 2.

8. The heat exchanger according to claim 7, wherein the ferritic stainless steel further comprises, in mass %, one or more of Mo: 0.3% to 3%, Nb: 0.05% to 1.0%, Ni: 0.1% to 2.0%, Cu: 0.10% to 1.0%, Sn, Sb, Zr, Co, and W: 0.005% to 0.5%, V: 0.03% to 1.0%, B: 0.0001% to 0.0030%, Mg: 0.0001% to 0.0050%, La: 0.001% to 0.1%, Y: 0.001% to 0.1%, Hf: 0.001% to 0.1%, REM: 0.001% to 0.1%, and Ca: 0.0001% to 0.0050%.

9. A method of producing the ferritic stainless steel according to claim 1, as a way to form the oxide, the method comprising the steps of:
setting a degree of vacuum less than $1 \times 10^{-2}$ Pa until temperature reaches 400° C. during heating of a steel plate comprising, in mass %, C: 0.030% or less, N: 0.030% or less, Si: 1.0% or less, Mn: 1.0% or less, P: 0.05% or less, S: 0.01% or less, Cr: 13% to 25%, Al: 0.003% to 0.30%, Ga: 0.001% to 0.05%, and a balance comprising Fe and unavoidable impurities;
performing a heat treatment on the steel plate at a soaking temperature of 900° C. to 1200° C. for a soaking time of 1 minute or more and 120 minutes or less; and
adjusting the degree of vacuum to being in a range of $10^{-2}$ Pa to $10^1$ Pa after the temperature reaches the soaking temperature in order to obtain the ferritic stainless steel.

10. The method of producing a ferritic stainless steel according to claim 9, wherein the steel plate further comprises, in mass %, one or more of Mo: 0.3% to 3%, Nb: 0.05% to 1.0%, Ni: 0.1% to 2.0%, Cu: 0.10% to 1.0%, Sn, Sb, Zr, Co, and W: 0.005% to 0.5%, V: 0.03% to 1.0%, B: 0.0001% to 0.0030%, Mg: 0.0001% to 0.0050%, La: 0.001% to 0.1%, Y: 0.001% to 0.1%, Hf: 0.001% to 0.1%, REM: 0.001% to 0.1%, and Ca: 0.0001% to 0.0050%.

11. A method of producing the ferritic stainless steel according to claim 2, as a way to form the oxide, the method comprising the steps of:
setting a degree of vacuum less than $1 \times 10^{-2}$ Pa until temperature reaches 400° C. during heating of a steel plate comprising, in mass %, C: 0.030% or less, N: 0.030% or less, Si: 1.0% or less, Mn: 1.0% or less, P: 0.05% or less, S: 0.01% or less, Cr: 13% to 25%, Ti: 0.001% to 0.30%, Al: 0.003% to 0.30%, Ga: 0.001% to 0.05%, and a balance comprising Fe and unavoidable impurities;
performing a heat treatment on the steel plate at a soaking temperature of 900° C. to 1200° C. for a soaking time of 1 minute or more and 120 minutes or less; and
adjusting the degree of vacuum to being in a range of $10^{-2}$ Pa to $10^1$ Pa after the temperature reaches the soaking temperature in order to obtain the ferritic stainless steel.

12. The method of producing a ferritic stainless steel according to claim 11, wherein the steel plate further comprises, in mass %, one or more of Mo: 0.3% to 3%, Nb: 0.05% to 1.0%, Ni: 0.1% to 2.0%, Cu: 0.10% to 1.0%, Sn, Sb, Zr, Co, and W: 0.005% to 0.5%, V: 0.03% to 1.0%, B: 0.0001% to 0.0030%, Mg: 0.0001% to 0.0050%, La: 0.001% to 0.1%, Y: 0.001% to 0.1%, Hf: 0.001% to 0.1%, REM: 0.001% to 0.1%, and Ca: 0.0001% to 0.0050%.

* * * * *